(12) United States Patent
Katiyar

(10) Patent No.: US 7,807,948 B2
(45) Date of Patent: Oct. 5, 2010

(54) CORED WELDING ELECTRODE AND METHOD OF MANUFACTURING THE SAME

(75) Inventor: Rajeev Katiyar, Mentor, OH (US)

(73) Assignee: Lincoln Global, Inc., Monterey Park, CA (US)

( * ) Notice: Subject to any disclaimer, the term of this patent is extended or adjusted under 35 U.S.C. 154(b) by 1394 days.

(21) Appl. No.: 11/129,822

(22) Filed: May 16, 2005

(65) Prior Publication Data

US 2006/0255027 A1 Nov. 16, 2006

(51) Int. Cl.
B23K 35/02 (2006.01)
(52) U.S. Cl. ............... 219/145.22; 219/145.1; 219/146.31
(58) Field of Classification Search ............ 219/145.22, 219/145.1, 146.31; 72/41, 42, 46; 508/110
See application file for complete search history.

(56) References Cited

U.S. PATENT DOCUMENTS

| | | | |
|---|---|---|---|
| 1,525,840 A | 2/1925 | Weed | |
| 1,722,929 A | 7/1929 | Lincoln | |
| 2,377,048 A * | 5/1945 | Smith | 148/26 |
| 2,785,285 A * | 3/1957 | Bernard | 219/146.22 |
| 2,876,148 A * | 3/1959 | Fritz | 148/246 |
| 2,944,142 A | 7/1960 | Sjoman | |
| 3,175,991 A * | 3/1965 | Morris et al. | 252/512 |
| 3,478,552 A * | 11/1969 | Dane | 72/42 |
| 3,534,390 A | 10/1970 | Woods et al. | |
| 3,848,109 A * | 11/1974 | Zvanut | 219/146.41 |
| 3,947,655 A | 3/1976 | Gonzalez et al. | |
| 4,048,705 A * | 9/1977 | Blanpain et al. | 419/61 |
| 4,186,293 A | 1/1980 | Gonzalez et al. | |
| 4,214,145 A * | 7/1980 | Zvanut et al. | 219/145.22 |
| 4,305,197 A | 12/1981 | Puschner et al. | |
| 4,379,811 A | 4/1983 | Puschner et al. | |
| 4,551,610 A | 11/1985 | Amata | |
| 4,629,110 A | 12/1986 | Holmgren et al. | |
| 4,688,411 A * | 8/1987 | Hagita et al. | 72/42 |
| 4,689,461 A * | 8/1987 | Gamberg | 219/69.1 |
| 4,717,536 A | 1/1988 | Chai et al. | |
| 4,721,837 A * | 1/1988 | Gamberg | 219/69.1 |
| 4,723,061 A | 2/1988 | Munz et al. | |
| 4,800,131 A | 1/1989 | Marshall et al. | |
| 4,833,296 A | 5/1989 | Crockett et al. | |
| 5,003,155 A | 3/1991 | Chai et al. | |
| 5,015,823 A | 5/1991 | Crockett et al. | |
| 5,055,655 A | 10/1991 | Chai et al. | |
| 5,118,919 A | 6/1992 | Chai et al. | |
| 5,120,931 A | 6/1992 | Kotecki et al. | |

(Continued)

FOREIGN PATENT DOCUMENTS

JP 06-063792 3/1994

(Continued)

Primary Examiner—M. Alexandra Elve
(74) Attorney, Agent, or Firm—Louis F. Wagner; Hahn Loeser & Parks LLP

(57) ABSTRACT

A manufacturing process is disclosed for manufacturing cored welding electrode, wherein calcium based drawing lubricant is applied to an outer surface of a flux cored welding electrode structure, and a drawing process is thereafter carried out to compact the core fill material and to set the final outer wire diameter. Cored welding electrodes are disclosed having calcium hydroxide within the electrode core, on the sheath, and/or in a sheath seam.

11 Claims, 5 Drawing Sheets

U.S. PATENT DOCUMENTS

| | | |
|---|---|---|
| 5,233,160 A | 8/1993 | Gordish et al. |
| 5,365,036 A | 11/1994 | Crockett et al. |
| 5,369,244 A | 11/1994 | Kulikowski et al. |
| 5,801,129 A * | 9/1998 | Damm ............... 508/175 |
| 5,821,500 A | 10/1998 | Araki et al. |
| 5,973,291 A | 10/1999 | Kramer et al. |
| 6,079,243 A | 6/2000 | Inoue et al. |
| 6,103,997 A | 8/2000 | Pan |
| 6,365,864 B1 | 4/2002 | Stava |
| 6,674,047 B1 * | 1/2004 | Hughes et al. ......... 219/145.22 |
| 6,750,430 B2 | 6/2004 | Kelly |
| 6,841,246 B2 | 1/2005 | Shimizu et al. |
| 6,855,913 B2 | 2/2005 | Nikodym |
| 2005/0044687 A1 | 3/2005 | Matsuguchi et al. |
| 2005/0077277 A1 | 4/2005 | Kim et al. |
| 2006/0124624 A9 * | 6/2006 | Kim et al. ............. 219/145.22 |

FOREIGN PATENT DOCUMENTS

| | | |
|---|---|---|
| JP | 2000-237894 | 9/2000 |
| WO | WO 00/38876 | 7/2000 |

* cited by examiner

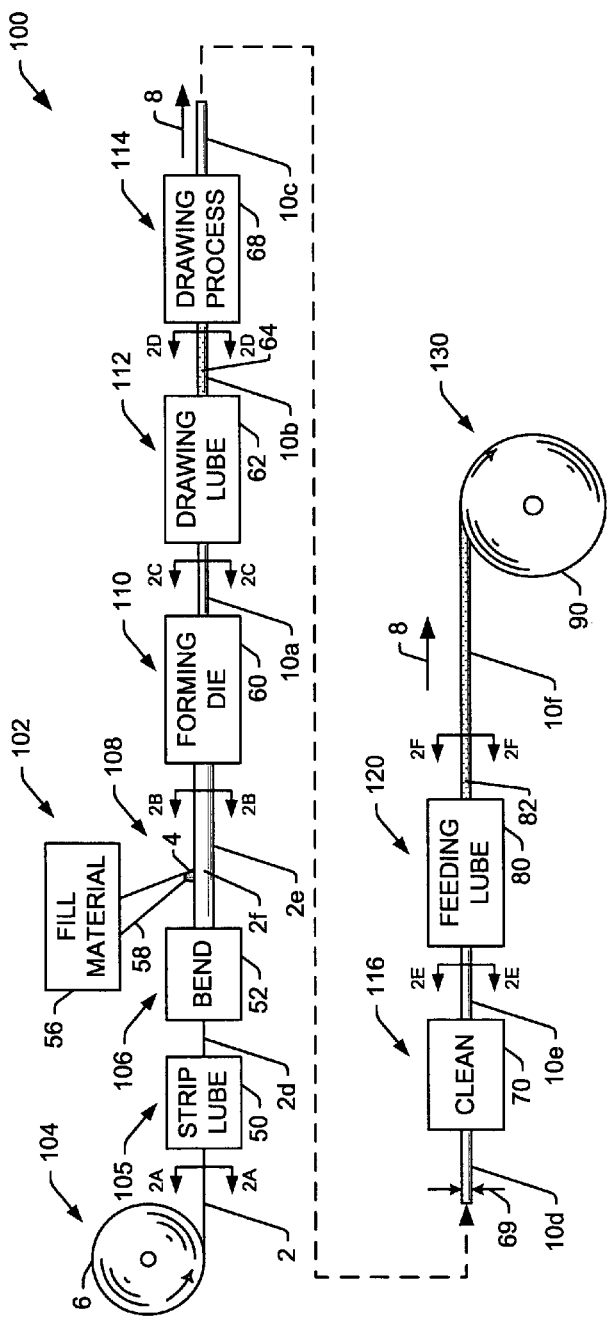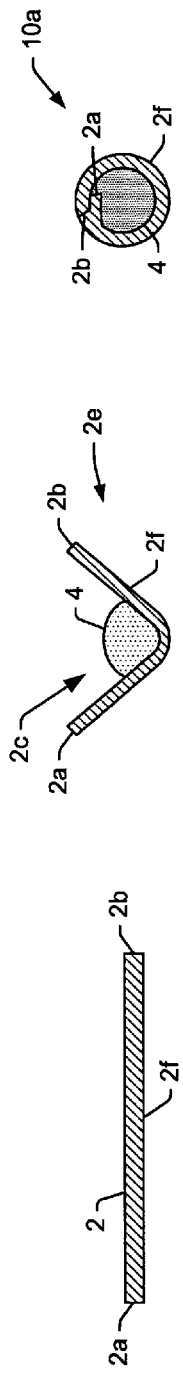

CORED WELDING ELECTRODE AND METHOD OF MANUFACTURING THE SAME

FIELD OF THE INVENTION

The present invention relates generally to arc welding technology, and more particularly to cored welding electrodes and methods of manufacturing cored welding electrodes.

INCORPORATION BY REFERENCE

Cored welding electrodes and techniques for manufacturing the same are described in the following United States patents and published applications, the contents of which are hereby incorporated by reference as background information: Weed U.S. Pat. No. 1,525,840; Lincoln U.S. Pat. No. 1,722,929; Bernard U.S. Pat. No. 2,785,285; Sjoman U.S. Pat. No. 2,944,142; Woods U.S. Pat. No. 3,534,390; Gonzalez U.S. Pat. No. 3,947,655; Gonzalez U.S. Pat. No. 4,286,293; Puschner U.S. Pat. No. 4,305,197; Amata U.S. Pat. No. 4,551,610; Holmgren U.S. Pat. No. 4,629,110; Chai U.S. Pat. No. 4,717,536; Munz U.S. Pat. No. 4,723,061; Marshall U.S. Pat. No. 4,800,131; Crockett U.S. Pat. No. 4,833,296; Chai U.S. Pat. No. 5,003,155; Crockett U.S. Pat. No. 5,015,823; Chai U.S. Pat. No. 5,055,655; Chai U.S. Pat. No. 5,118,919; Kotecki U.S. Pat. No. 5,120,931; Gordish U.S. Pat. No. 5,233,160; Crockett U.S. Pat. No. 5,365,036; Kulikowski U.S. Pat. No. 5,369,244; Araki U.S. Pat. No. 5,821,500; Kramer U.S. Pat. No. 5,973,291; Inoue U.S. Pat. No. 6,079,243; Pan U.S. Pat. No. 6,103,997; Shimizu U.S. Pat. No. 6,337,144; Kotecki U.S. Pat. No. 6,339,209; Stava U.S. Pat. No. 6,365,864; Hughes U.S. Pat. No. 6,674,047; Kelly U.S. Pat. No. 6,750,430; Nikodym U.S. Pat. No. 6,855,913; Matsuguchi US 2005/0044687 A1; and Kim US 2005/0077277 A1.

BACKGROUND OF THE INVENTION

Arc welding is a process of joining metals through deposition of molten metal to a workpiece using an arc between a consumable welding electrode and the workpiece. The welding electrode is directed by a wire feeder toward the welding operation in the form of a continuous wire fed through a welding torch cable from a wire supply, and an arc is generated at the torch between the end of the electrode and the workpiece for melting and depositing electrode material to a weld in a controlled fashion. Many arc welding processes, such as metal inert gas (MIG) techniques, employ an external inert shielding gas such as argon around the welding arc to inhibit oxidation or nitridation of the molten metal. Non-inert external shielding gases such as $CO_2$ may also be used, whereby such processes are sometimes generally referred to as gas metal arc welding (GMAW). Other arc shielding processes similarly provide a protective shield of vapor to cover the arc and slag to protect the molten weld pool as it cools. The molten electrode material may be transferred to the workpiece by several mechanisms or processes, such as short-circuit welding, spray arc welding, and pulse welding.

Cored welding electrodes are welding consumables having a tubular core or interior region surrounded by an outer sheath, where the core may include fluxing elements (e.g., flux cored electrodes), deoxidizing and denitriding agents, alloying materials, and elements that increase toughness and strength, improve corrosion resistance, and stabilize a welding arc. Flux cored arc welding (FCAW) processes employ flux-cored electrodes which include flux within the electrode core to produce an extensive slag cover during welding, where the slag protects and shapes the resulting weld bead as it cools. Such cored electrodes are typically constructed beginning with a flat metal strip that is initially formed first into a "U" shape, for example, as shown in Bernard U.S. Pat. No. 2,785,285, Sjoman U.S. Pat. No. 2,944,142, and Woods U.S. Pat. No. 3,534,390. Flux, alloying elements, and/or other core fill materials are then deposited into the "U" and the strip is closed into a tubular configuration by a series of forming rolls. As in GMAW processes, the flux-cored process uses a gas shield to protect the weld zone from detrimental atmospheric contamination (e.g., particularly from oxygen and/or nitrogen), where the shielding gas can be applied externally, or it may be generated from the decomposition of gas forming ingredients contained in the electrode core itself (sometimes referred to as a self-shielding flux cored electrode). In such self-shielded FCAW, the heat of the arc causes decomposition and some vaporization of the electrode's flux core, which partially protects the molten metal.

Various types of flux-cored welding electrodes are designed for self-shielding and externally shielded FCAW applications. In all types of cored welding electrodes, it is desirable to minimize the amount of moisture in the core fill material, to prevent adverse effects in the finished weld joint. One such moisture-related problem is known as "gas tracking" or "worm tracking", in which marks or tracks appear as a series of depressions in the shape of a "worm" on the weld surface. This situation is caused by gases being trapped under the slag as the weld solidifies, where the slag cools and solidifies before the gas can escape. Gas tracking is at least partially worsened by moisture in the flux core of the flux cored electrodes. Encroachment of moisture into a cored electrode interior may result from various causes, including poor joint seal in the electrode manufacturing process, storage of the electrode in a damp environment, and/or unprotected wire being exposed to humidity when loaded on the wire feeder spool of a welding system. Efforts to reduce gas tracking and to otherwise combat excessive cored electrode moisture include preheating the flux cored electrode, either by external preheating apparatus prior to use and/or by employing longer wire stick out distances or contact to work distances (CTWD) in the welding process itself to thereby preheat the electrode using the weld current. However, external heating sources are costly in terms of energy and welding system space limitations, and longer CTWD may limit the performance of the welding process in other respects. Another problem in FCAW processes is diffusible hydrogen, which is worsened by moisture in the flux cored electrode. Increased diffusible hydrogen in the weld metal leads to increased cracking when the weld metal solidifies, wherein solid electrode welding has thus far been preferred over FCAW for military and other welding applications in which high strength weld joints are needed. Consequently, there is a continuing need for improved cored welding electrodes and manufacturing methods by which electrode core moisture can be mitigated or eliminated.

SUMMARY OF INVENTION

The present invention relates to cored welding electrodes, such as flux-cored electrodes and other welding electrodes having an outer sheath that wholly or partially encloses a core fill material, including calcium hydroxide in the sheath and/or core, as well as methods or processes for manufacturing the same. A summary of one or more aspects of the invention is now presented to facilitate a basic understanding thereof, wherein this summary is not an extensive overview of the invention, and is intended neither to identify certain elements of the invention, nor to delineate the scope of the invention.

Rather, the primary purpose of the summary is to present some concepts of the invention in a simplified form prior to the more detailed description that is presented hereinafter.

In accordance with one or more aspects of the invention, a method is provided for manufacturing cored welding electrode. The method comprises forming a strip or sheath material into a U or V shape to provide a channel between the outer edges thereof, and adding core fill material into the channel. The outer sheath edges are joined to provide a cored electrode structure with the fill material substantially enclosed within the sheath material. The method further provides for application of a calcium hydroxide based drawing lubricant to create a coated cored electrode with a calcium based lubricant coating, after which a drawing process is performed on the coated cored electrode. The calcium hydroxide based drawing lubricant can also be employed as a feeding lubricant with the outer wire surface being coated therewith in final packaged state to enhance feedability in a subsequent welding process while continuing to provide reduction in moisture encroachment during transport, storage, and use at a welding site. In one example, the drawing lubricant has about 15 to 40 percent calcium hydroxide ($Ca(OH)_2$) by weight, and may also include about 5 to 10 percent graphite and about 30 percent or more non-toxic metal by weight. The coating is applied in one implementation of the invention by providing a container including granular or powder calcium hydroxide based drawing lubricant, and passing the cored electrode structure through the lubricant in the container over a predetermined linear distance, where the wire speed through the container and/or the distance of the lubricant container are adjusted in order to control the amount of the calcium based drawing lubricant applied to the outer surface of the cored electrode. Thereafter, the coated electrode is drawn to a final diameter for compacting the core fill materials inside the sheath and for setting the final outer wire dimension. The drawing lubricant can be applied to the cored electrode structure at one or more points in an overall manufacturing process, for example, including application prior to each of several drawing dies or forming rolls, as well as following drawing to operate as a feeding lubricant.

In accordance with another aspect of the invention, a cored welding electrode is provided, comprising a sheath material in the form of a continuous tubular structure defining a center core area, with a core fill material within the core area being substantially enclosed within the sheath material. The electrode further comprises a calcium hydroxide based lubricant on an outer surface of the sheath material. The core material in one example is a granular or powder fill material including flux materials, and calcium hydroxide based lubricant may also be located within the core area and/or in a seam of the sheath material. In addition, the cored welding electrode may be further coated with a second lubricant for feedability in welding systems, which may also be a calcium hydroxide based lubricant, where such a feeding lubricant coating is provided on the outer surface of the sheath material or on any remaining calcium hydroxide based drawing lubricant.

BRIEF DESCRIPTION OF THE DRAWINGS

The following description and drawings set forth in detail certain illustrative implementations of the invention, which are indicative of several exemplary ways in which the principles of the invention may be carried out. Various objects, advantages and novel features of the invention will become apparent from the following detailed description of the invention when considered in conjunction with the drawings, in which:

FIG. 1 is a schematic diagram illustrating an exemplary process for manufacturing cored welding electrode in accordance with one or more aspects of the invention;

FIG. 2A is a partial end elevation view in section taken along line 2A-2A of FIG. 1, illustrating a flat strip of sheath material used in manufacturing cored electrode;

FIG. 2B is a partial end elevation view in section taken along line 2B-2B of FIG. 1, illustrating the sheath strip formed into a U or V shape with core fill material added to a channel of the formed sheath;

FIG. 2C is a partial end elevation view in section taken along line 2C-2C of FIG. 1, illustrating the sheath strip with lateral sheath strip edges joined to create a cored electrode structure with fill material substantially enclosed within the sheath material;

DETAILED DESCRIPTION OF THE INVENTION

Figure 2D:
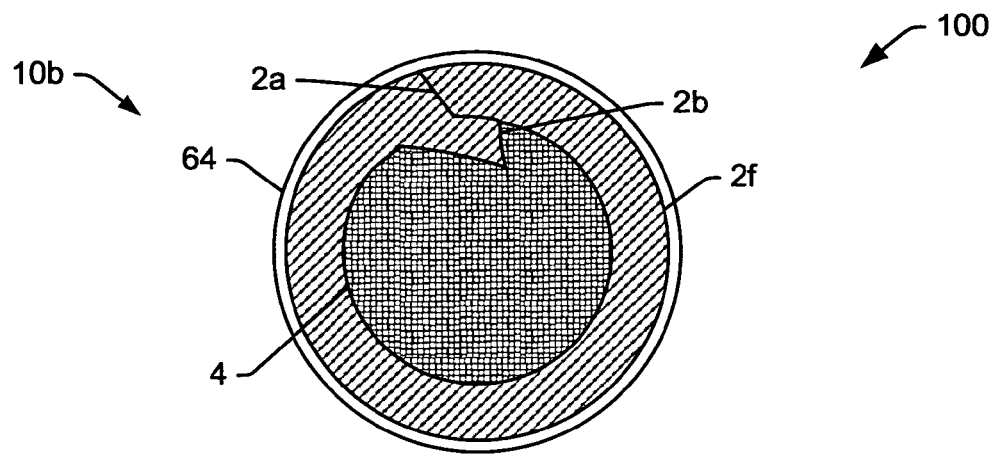
FIG. 2D is an enlarged end elevation view in section taken along line 2D-2D of FIG. 1, illustrating the cored electrode coated with a calcium hydroxide based drawing lubricant in accordance with the invention.

The invention relates to manufacturing of cored welding electrodes. One or more exemplary implementations of the present invention are hereinafter illustrated and described, wherein like reference numerals are used to refer to like elements throughout and wherein the illustrated structures are not necessarily drawn to scale. The invention relates to techniques by which cored welding electrodes can be manufactured with improved moisture resistance. The invention may thus facilitate reduced gas tracking and diffusible hydrogen in flux cored welding operations and may be employed alone or in combination with external electrode preheating systems or increased stick-out distances. The inventor has appreciated that the use of calcium hydroxide based drawing lubricant in the production of flux cored electrode can improve moisture resistance while providing suitable lubrication for drawing operations. In addition, the moisture resistant characteristics of the calcium hydroxide based lubricant may be used for post-manufacturing protection by application of a calcium hydroxide based lubricant as a feeding lubricant. During the manufacturing of cored welding electrode, drawing lubricant or drawing soap is used to facilitate drawing operations in which the wire is drawn or passed through one or more drawing dies and/or rollers. In the past, such drawing lubricants were typically sodium based. The drawing operations are carried out to reduce the outer diameter of the cored electrode structure to a final product value and also to compact the core filler material inside the electrode sheath in a controlled fashion. In this regard, the inventor has appreciated that traditional sodium based lubricants have a tendency to absorb moisture during electrode drawing operations, and has found that calcium hydroxide based lubricants are less hygroscopic than sodium based lubricants in the context of cored welding electrode manufacturing processes. While not wishing to be tied to any particular theory, it is believed that because calcium particles generally are larger and have less surface area by volume than sodium particles, calcium particles have less area for moisture adsorption. Moreover, the melting point of calcium is higher than that of sodium whereby calcium hydroxide based drawing lubricants are less likely to break down during drawing operations to reduce the size of the cored electrode during manufacturing, and are therefore unlikely to liquefy and seep into the fill and increase the core moisture. As a result, the use of calcium hydroxide based drawing lubricants in the manufacturing processes of the invention helps to combat moisture in the manufactured cored electrode, and hence to mitigate the adverse effects of gas tracking and/or diffusible hydrogen in the weld metal. Moreover, these moisture reduction benefits of calcium hydroxide base lubricants can also be realized in post manufacturing transportation, storage, and use at a welding site by applying the calcium hydroxide based lubricant to the cored electrode after drawing as a feeding lubricant. Furthermore, the invention is applicable to manufacture of any type of cored welding electrodes and finds particular utility in association with the manufacture of gas shielded flux cored electrodes as well as shelf-shielded flux cored electrodes.

Referring now to the FIGURES, an exemplary flux cored welding electrode manufacturing process or method 100 is illustrated in FIG. 1. While illustrated and described herein as a series of acts or events, it will be appreciated that the exemplary process or method 100 and other processes of the invention are not limited by the illustrated ordering of such acts or events. In this regard, some acts or events may occur in different orders and/or concurrently with other acts or events apart from those illustrated and described herein, in accordance with the invention. It is further noted that not all illustrated steps may be required to implement a process in accordance with the present invention. The methods of the invention, moreover, may be implemented in association with the illustrated structures and systems as well as with other apparatus not illustrated or described, wherein all such alternatives are contemplated as falling within the scope of the invention and the appended claims. In addition, it is noted that the exemplary process 100 is a continuous process, beginning with a strip of substantially flat sheath material 2 being provided at a first end in continuous fashion, and ending with manufactured cored welding electrode wire 10 being wound onto cylindrical spools 90 for shipment and/or storage, where the sheath material 2 and the manufactured electrode 10 are continuous with the finished electrode 10 being separated from the process 100 as spools 90 are wound to capacity, at which time another reel or spool 90 is inserted while the process 100 continues. Alternatively, the process 100 may be implemented in two or more tiers or stages, for example, with cored electrode being stored on temporary storage reels or spools between manufacturing stages.

Figure 5:
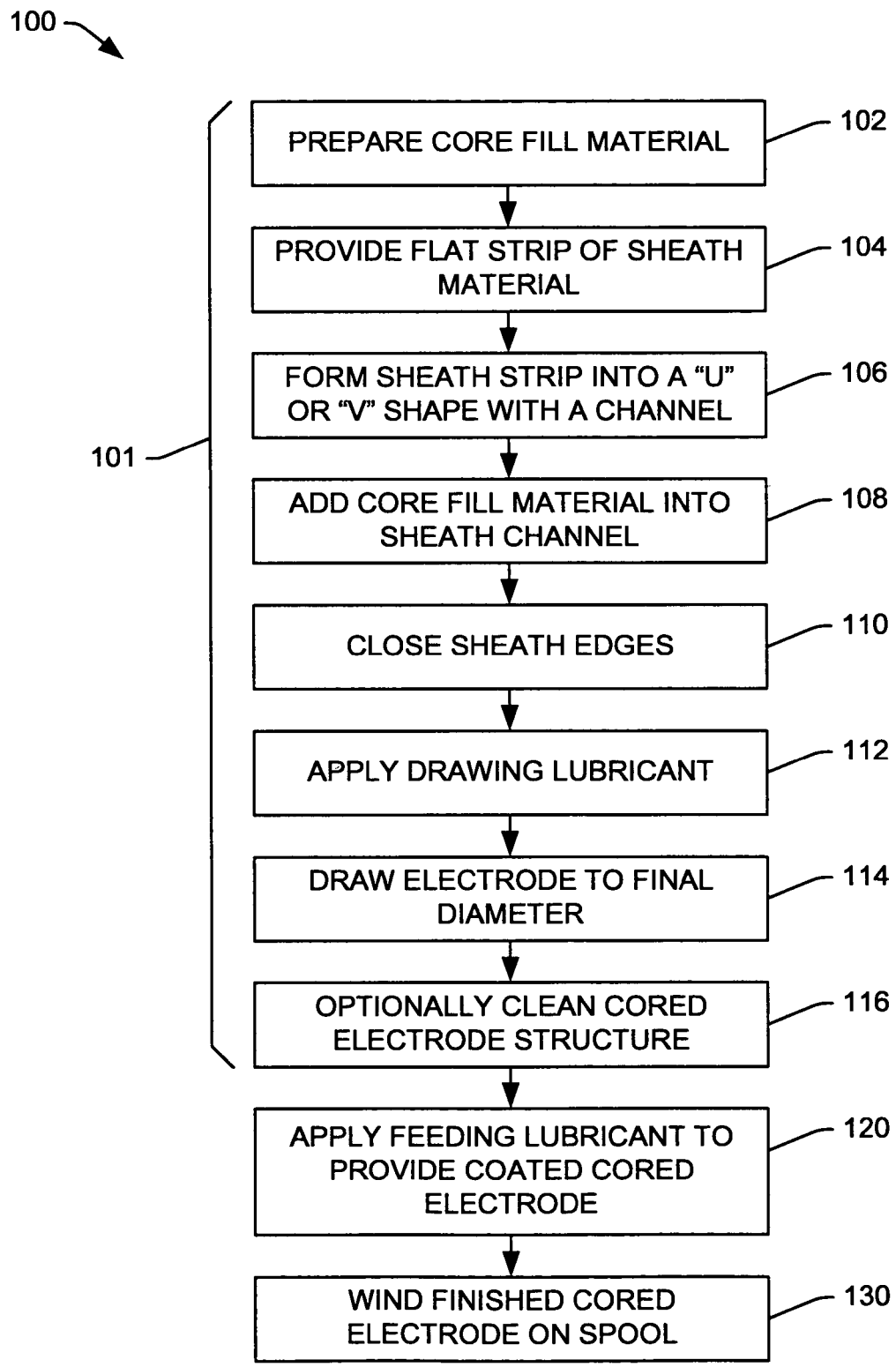
FIG. 5 is a flow diagram illustrating an exemplary process or method of manufacturing cored welding electrode in accordance with the present invention.

Referring to FIGS. 1-3 and 5, FIG. 1 illustrates a process or method 100 for manufacturing an exemplary flux cored welding electrode 10, FIG. 5 provides a flow diagram of the exemplary process 100, and FIGS. 2A-2I show sectional views of electrode 10 at various points in the manufacturing process 100 of FIGS. 1 and 5. Process 100 in general provides for manufacture of a cored electrode structure at 101 (FIG. 5), followed by application of feeding lubricant and packaging at 120 and 130, respectively. As shown in FIGS. 1 and 5, the process 100 includes preparation or provision of core fill material 4 at 102 along with provision of a flat strip 2 of sheath material at 104. In an exemplary implementation of process 100, sheath material 2 is mild steel, with core fill material 4 including fluxing and alloying materials, although any suitable sheath strip and core fill materials 2, 4 may be used in manufacturing a cored welding electrode in accordance with the present invention. The electrode materials 2, 4 in general are designed for providing weld joint filler metal, as well as for deoxidizing, denitriding, slag formation, arc stabilization, alloying, and/or to provide shielding gas for a target welding process, where the sheath or steel portion 2 preferably comprises about 75 to 90 percent of the electrode by weight, with the core material 4 providing the remaining 10 to 25 percent. In general, sheath material 2 may be any suitable ferrous or non-ferrous metal, alloy composition, or a bimetallic structure comprising two or more different alloys, which is useful for producing flux-cored welding electrodes, such as steel, where the material employed in a given electrode manufacturing process may be selected according to the type of welding process in which the packaged electrode will be employed. In this regard, the materials 2, 4 may be selected according to whether the target welding process is self-shielded or whether external shielding gas is to be used.

Core material 4 may include any type of solid and/or liquid material that operates to provide desired welding conditions and/or materials during use in FCAW processes. In one suitable example, core fill material 4 comprises a granular and/or powder form of one or more materials to provide welding flux in a welding operation, to control or inhibit oxidation and/or nitridation in the finished weld metal, alone or in combination with alloying materials to control the material content of the finished weld metal (e.g., elements to increase weld joint strength and/or toughness and/or to enhance corrosion resistance), and/or for welding arc stabilization. The selection of core fill material constituents preferably accounts for whether the cored-electrode is intended for self-shielding or gas shielded welding processes. In this regard, core fill material 4 for self-shielding type flux-cored electrode 10 wires preferably includes additional gas forming elements to inhibit or prevent ambient oxygen and/or nitrogen from contacting metal being transferred across a welding arc and/or deposited metal of the molten weld puddle or pool on the workpiece. The core fill material 4 is preferably in powder or granular form, including one or more powders typically used in cored electrodes as alloying agents, fluxing agents, slag formers, arc stabilizers, deoxidizers, desulfurizers, denitriders, dephosphorizers, or other constituents to achieve one or more desired operating characteristics during welding, such as reducing spatter, improving weld bead appearance, etc. Examples of suitable arc stabilizers include but are not limited to graphite, sodium titanate, potassium titanate, and feldspars, and some useful slag forming and gas forming materials include titanium dioxide, silicon dioxide, magnesium oxide, aluminum oxides, carbonates, fluorides, and the like. Core material 4 may include alloying agents, such as chromium, aluminum, titanium, boron, iron, copper, cobalt, manganese, vanadium, nickel, molybdenum, niobium, tungsten, and/or alloys thereof, and some suitable deoxidizing, desulfurizing, and/or denitriding materials may be used, for example, calcium, titanium, barium, magnesium, aluminum, silicon, zirconium, rare earths metals, and/or alloys thereof.

In the initial flat strip form, sheath 2 includes two generally parallel laterally opposite outer edges 2a and 2b, as well as a lower edge or surface 2f that will subsequently form an outer surface of the cored electrode sheath (FIG. 2A), with sheath strip material 2 being provided from a roll 6 (FIG. 1) or other supply in a continuous form. An initial strip lubricant (not shown) may be provided to surface 2f of strip 2 at 105 via any suitable lubrication providing process and apparatus 50 (FIG. 1), so as to facilitate initial bending or forming operations in the process 100. At 106 in FIGS. 1 and 5, strip 2 is formed (e.g., bent) into a "U" or "V" shape, thereby providing a channel 2c between outer edges 2a and 2b, as best shown in FIG. 2B. Sheath material 2 is supported throughout process 100 along various guiding and support apparatus (not shown) and translated along an axial direction indicated by arrow 8 in FIG. 1, where suitable forming rollers and/or dies 52 are employed at 106 to initially form sheath strip 2 into a V or U shape, thereby providing channel 2c. Fill material 4 is then introduced or added at 108 into channel 2c (FIG. 2B), for example, using a granule feeding apparatus having a hopper or store 56 and a controllable feeding tube 58 (FIG. 1) configured to supply core fill material 4 to channel 2c at a volume transfer rate determined according to the speed at which strip 2 is translated in direction 8 and according to the desired final dimensions of finished cored electrode 10. Process 100 continues at 110 with lateral strip edges 2a and 2b being joined or otherwise closed to form a sheath seam or joint by procession of strip 2 through a forming die or a series of forming rolls 60 to provide a cored electrode structure 10a with core fill material 4 being substantially enclosed within sheath material 2 (FIGS. 1 and 2C), wherein edges 2a and 2b at the sheath seam may abut one another or may be folded over one another as in the exemplary electrode 10a of FIG. 2C. Core fill material 4 may be substantially enclosed by sheath 2 at 110 in any suitable fashion, preferably with a resulting seam between sheath edges 2a and 2b being impervious to moisture, although perfect joinder or closure is not a strict requirement of the invention. In this regard, the seam may optionally be welded or further closed with adhesives (not shown).

Referring now to FIGS. 1, 2D, 3, and 5, at this point in process 100, core fill material 4 may remain somewhat loosely packed and the cored electrode structure 10a is slightly larger than the desired final production specification. Accordingly, the electrode 10a is provided with an external coating of drawing lubricant at 112 and subjected to a drawing process 68 at 114 to compact core material 4 and to set a final outer wire diameter. Drawing process 68 may include feeding the cored electrode structure 10b through one or more dies and or forming rolls, wherein drawing lubricant may be applied prior to any or all such forming devices to provide lubrication during forming steps. In accordance with various aspects of the present invention, moreover, a calcium hydroxide based drawing lubricant 64 is applied at 112 using a drawing lubricant application process and system 62 in order to provide a coated cored electrode 10b with a calcium based lubricant coating 64 prior to drawing at 114. In operation, drawing lubricant 64 adheres to outer electrode sheath surface 2f and provides lubrication during a drawing process 68 at 114 to minimize damage to sheath 2 as electrode 10b is engaged by roller and/or die surfaces (not shown) in drawing process 68. Any suitable calcium hydroxide based drawing lubricant 64 may be used within the scope of the invention, having a non-zero amount of calcium hydroxide (e.g., $Ca(OH)_2$). Stoichiometric variations in the relative amounts of calcium (Ca), oxygen (O) and hydrogen (H) in the calcium hydroxide portion of lubricant 64 are of course possible, wherein the invention is not limited to calcium hydroxide lubricant components with a stoichiometry exactly matching the formula $Ca(OH)_2$, and all such variant implementations are contemplated as falling within the scope of the present invention and the appended claims. In one possible implementation, drawing lubricant 64 includes about 40 percent or less calcium hydroxide by weight. In another implementation, the calcium hydroxide percentage of lubricant 64 is about 15 percent or more by weight. One preferred drawing lubricant of the invention comprises about 15 to 40 percent calcium hydroxide by weight, and may also include about 5 to 10 percent graphite with about 30 percent or more non-toxic metal by weight, although these amounts are not strict requirements of the invention. Another aspect of the invention provides for controlling the amount of calcium hydroxide based drawing lubricant 64 applied to electrode outer surface 2f.

Figure 2E:
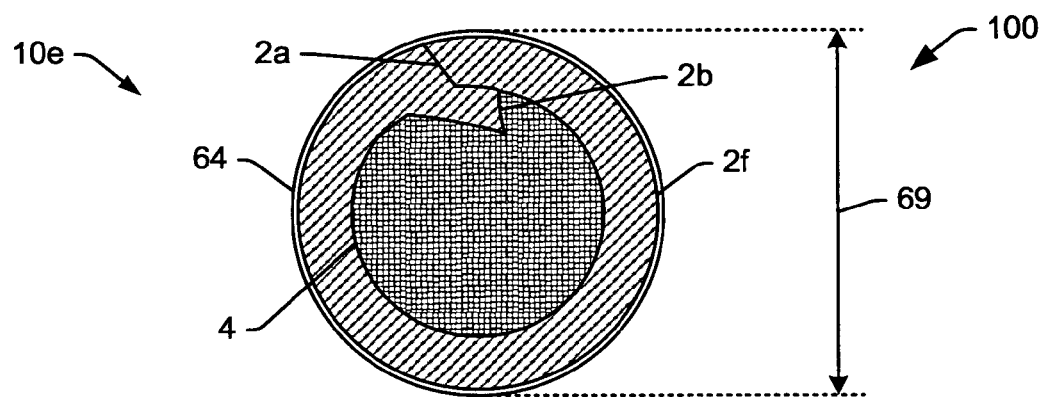
FIG. 2E is an enlarged partial end elevation view taken along line 2E-2E of FIG. 1 illustrating the cored electrode following a drawing process to compact the core fill material and set the final outer wire diameter and after a subsequent cleaning operation, wherein some amount of the drawing lubricant remains on the outer sheath surface.
Figure 2G:
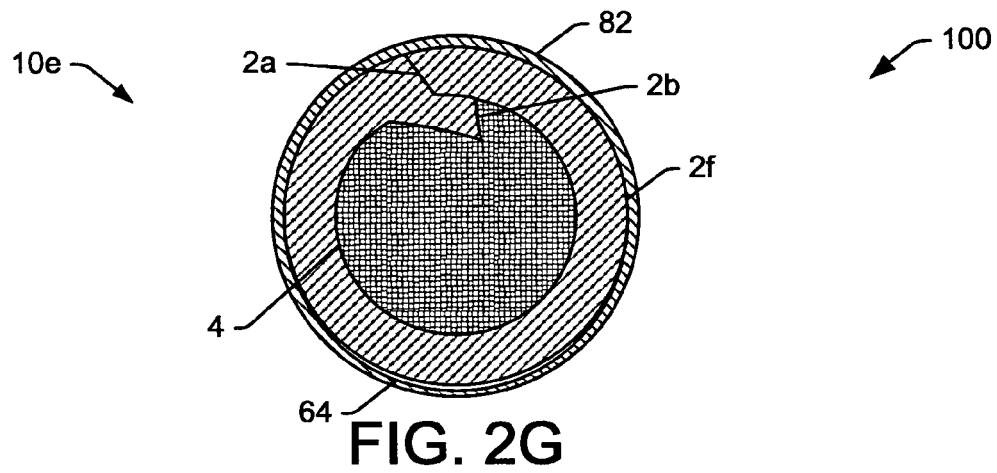
FIG. 2G is an enlarged partial end elevation view taken along line 2F-2F of FIG. 1 illustrating another possible cored electrode in accordance with the invention, with remnant calcium hydroxide based drawing lubricant on a portion of the outer sheath surface, with a feeding lubricant coating applied over the remaining drawing lubricant and the outer sheath surface.
Figure 2H:
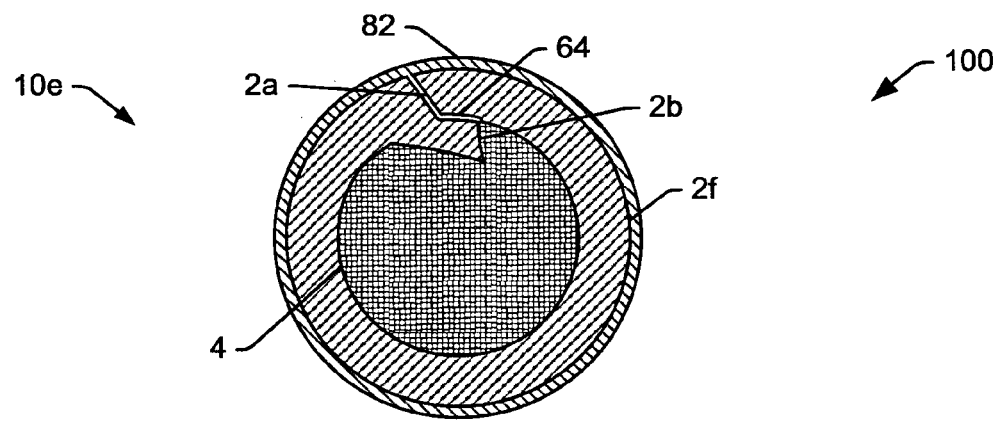
FIG. 2H is an enlarged partial end elevation view taken along line 2F-2F of FIG. 1 illustrating another possible cored electrode, having calcium hydroxide based drawing lubricant remaining in a sheath seam and with a feeding lubricant coating on the outer sheath surface.
Figure 2I:
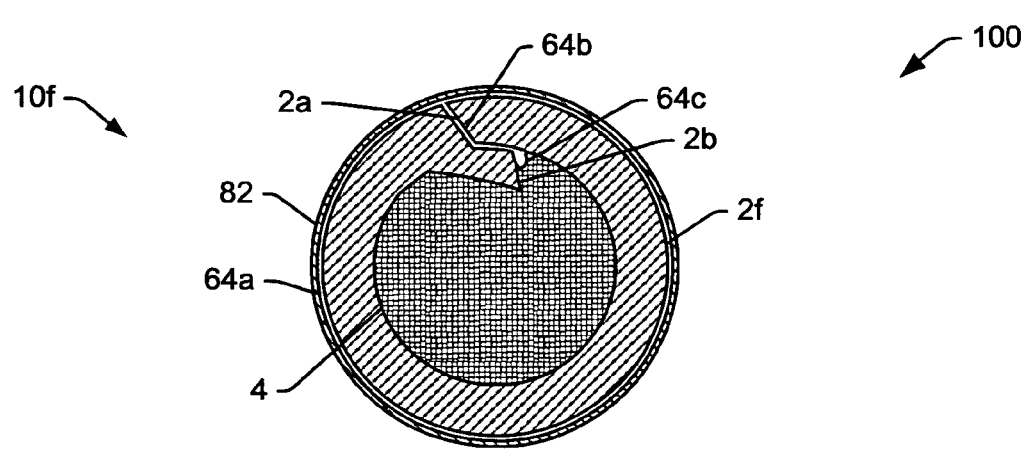
FIG. 2I is an enlarged partial end elevation view taken along line 2F-2F of FIG. 1 illustrating the cored electrode with remnant calcium hydroxide based drawing lubricant on the outer sheath surface, in the sheath seam, and also within the center core area, along with feeding lubricant coating applied over the remaining drawing lubricant and the outer sheath surface.
Figure 3:
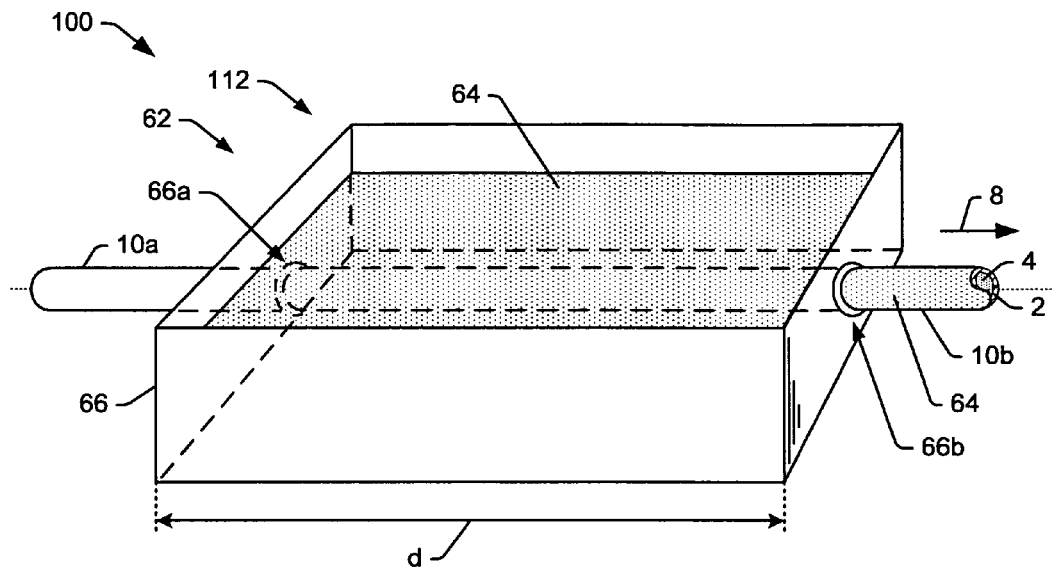
FIG. 3 is a perspective view illustrating an exemplary coating operation in the manufacturing process of FIG. 1, in which a granular or powder calcium hydroxide based drawing lubricant is provided in a container and the cored electrode structure is drawn through the container to provide a coated cored electrode with calcium hydroxide based lubricant coating prior to a drawing process in accordance with the invention.

Referring to FIGS. 1, 2C, 2D, and 3, any suitable lubricant application systems and methodologies may be employed to coat outer electrode sheath surface 2f with lubricant 64 at 112 within the scope of the invention. FIG. 3 illustrates one such system 62 for applying drawing lubricant at 112 in the exemplary manufacturing process 100. In this example, drawing lubricant 64 is provided in the form of granules or powder 64 in a substantially rectangular box or container 66 with a longitudinal length d and having entrance and exit openings 66a and 66b, respectively, wherein container 66 is filled with granular and/or powder lubricant 64 to a level above that of openings 66a and 66b. Cored electrode structure 10a is provided to entrance opening 66a and is thereafter passed through lubricant 64 in container 66 to exit opening 66b over the predetermined linear distance d, whereby lubricant particles 64 adhere to outer surface 2f, thereby yielding a coated cored electrode 10b at the output of lubricant application process/system 62 with a calcium hydroxide based lubricant coating 64, as best shown in FIG. 2D. In the illustrated coating operation 62, moreover, the amount of calcium based drawing lubricant 64 applied to outer surface 2f is controlled by adjustments to the speed at which electrode 10 is passed through lubricant 64 in direction 8 and/or by controlling or adjusting the predetermined linear distance d of container 66, wherein different containers 66 may be employed having different longitudinal lengths d for different desired coating amounts and/or for different linear drawing speeds. In this fashion, the amount of coating lubricant 64 applied to surface 2f of electrode 10b is controllable in the manufacturing process 100. Referring again to FIGS. 1 and 5, coated electrode 10b is then provided to a drawing process or operation 68 at 114 in which coated electrode 10b is drawn to a final outer diameter (OD) 69 (FIG. 2E below) and core fill material 4 is compacted inside sheath 2, to provide electrode 10c in FIG. 1. Where multiple forming devices are used in the drawing process 68 at 114, additional drawing lubricant application stations (e.g., such as system 62 in FIG. 3) may be provided upstream of any or all such forming dies or rollers, whereby calcium hydroxide based drawing lubricant can be applied to cored electrode structure 10b at multiple points in the manufacturing process 100 as need to ensure adequate lubrication during such forming. Following the drawing operation at 114, the drawn and compacted electrode 10d may be provided to an optional thermal or other type cleaning operation 70 at 116 to remove some or all residual drawing lubricant 64 from outer surface 2f. As discussed further with respect to FIGS. 2G-2I below, some calcium hydroxide based drawing lubricant may remain after the cleaning operation 70 at 116, forming part of the finished cored welding electrode 10f in accordance with another aspect of the invention.

In the illustrated example, the resulting drawn and cleaned cored electrode structure 10e is shown in FIG. 2E having the desired final OD 69 that ensures or facilitates compatibility between the cored electrode 10 and a wire feeder 210 employed in a target welding process WP (FIG. 4 below), wherein the compaction of fill material 4 ensures the appropriate proportions of sheath steel material 2 and fill material 4 to achieve the desired weld properties therein. In the example of FIG. 2E, some calcium hydroxide based drawing lubricant 64 remains on the outer surface 2f. At 120, feeding lubricant 82 is applied to electrode 10e in a process 80 (FIG. 1) in order to provide finished or final coated flux cored welding electrode 10f, best shown in FIG. 2F, wherein the feeding lubricant 82 resides on the outer sheath surface 2f and/or on the remnant drawing lubricant 64. In accordance with another aspect of the invention, the feeding lubricant 82 may also be a calcium hydroxide based material, and may be the same material as the drawing lubricant 64. In this regard, the hydrogen inhibiting properties of such a calcium hydroxide lubricant 82 may advantageously aid in preventing moisture encroachment of the core 4 following drawing operation 68 to protect hydrogen sensitive cored electrode 10 during packaging, shipment, storage, and use at a welding site. Another possible situation is illustrated in FIG. 2G, where some amount of drawing lubricant 64 remains over only a portion of outer sheath surface 2f, with feeding lubricant coating 82 applied on the exposed outer sheath surface 2f and over the remnant drawing lubricant 64. Still another possibility is shown in FIG. 2H, with a certain amount of drawing lubricant 64 having migrated into the sheath seam between edges 2a and 2b of sheath 2, wherein substantially all the outer drawing lubricant 64 having been removed by cleaning operation 70 at 116. In this case, subsequent application of feeding lubricant 82 provides a coating over outer sheath surface 2f with calcium hydroxide based lubricant 64 remaining on sheath surface at the seam joint. Yet another example is illustrated in FIG. 2I, wherein drawing lubricant 64c is impregnated during drawing operation 68 into a portion of the center core area, along with calcium hydroxide based lubricant 64b in the seam joint of sheath 2. In this example, moreover, a certain amount of drawing lubricant 64a remains on outer sheath surface 2f, and feeding lubricant coating 82 is applied over the remnant drawing lubricant 64a. The invention thus provides cored welding electrodes 10f with a sheath material 2 in the form of a continuous tubular structure defining a center core area, with a core fill material 4 substantially enclosed within sheath 4, along with calcium hydroxide based lubricant 64 on an outer surface of the sheath material, where lubricant 64 may also be located within the core area and/or in the sheath seam, wherein the illustrated examples are not exhaustive of all the possible cored electrodes within the scope of the invention.

Figure 2F:
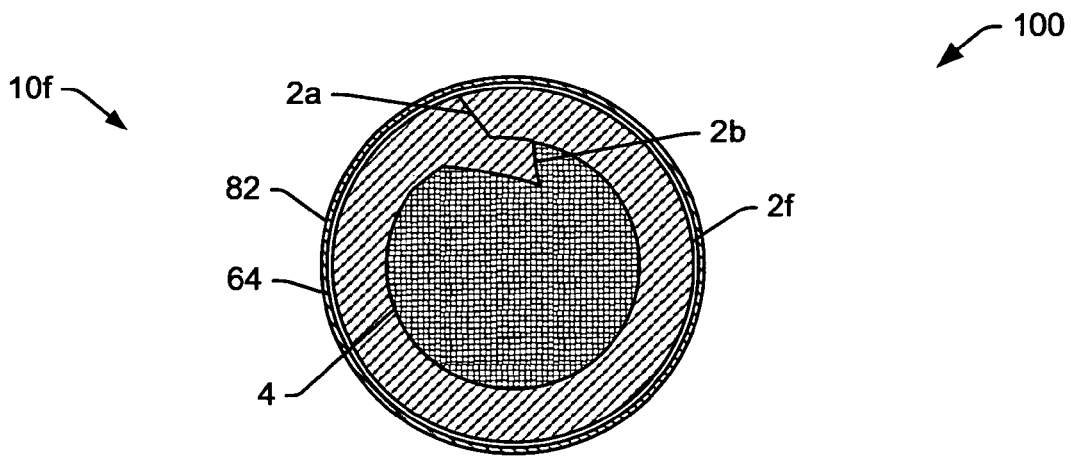
FIG. 2F is an enlarged partial end elevation view taken along line 2F-2F of FIG. 1 illustrating the cored electrode coated with a feeding lubricant applied over the remaining drawing lubricant and outer sheath surface after the optional cleaning step.

Other suitable intermediate operations may also be performed in manufacturing process 100, for example, annealing, further drawing operations, and/or coating steps (not shown) to yield the finished cored electrode 10f of FIGS. 1 and 2F. Process 100 and particularly drawing process 68 thereof at 114 preferably provide essentially complete and uniform compaction of fill material 4 without separation of the fill mixture, as well as a seam joint of sheath edges 2a and 2b that does not separate during process 100, or in storage on reel 90, or in operational use when fed through a wire feeder 210 to a welding process WP. In this regard, the integrity of the seam or joinder of edges 2a and 2b may impact welding performance of electrode 10 with respect to preventing loss of material 4 from the core and/or inhibiting moisture penetration through sheath 2 into core fill material 4. In addition, uniformity of the seam joint and the final outer diameter 69, as well as uniformity of core compaction and uniformity of any applied outer feeding lubricant coating 82 may affect feedability and/or electrical properties of finished electrode 10f in use, wherein process 100 may be designed with these considerations in mind so as to avoid or mitigate feeding problems, sporadic arc engagement problems, discontinuities in the applied coatings at 105, 112, and/or 120, as well as to minimize moisture penetration of core material 4. Continuing at 130 in FIGS. 1 and 5, finished electrode 10f is provided to a winding/packaging operation and is installed (e.g., coiled or wound) onto a spool or reel 90, which can be rotatably mounted near the wire feeding apparatus 210 of a welding system 200 (FIG. 4 below).

Figure 4:
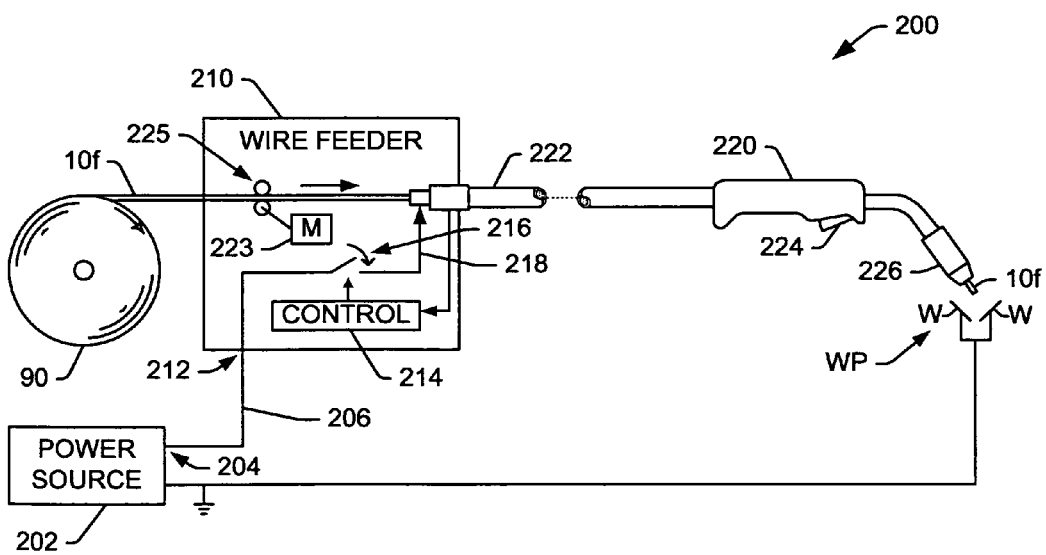
FIG. 4 is a simplified side elevation view illustrating an exemplary flux cored arc welding process using the cored electrode manufactured in FIG. 1.

FIG. 4 illustrates a welder or welding system 200 in which the finished cored electrode 10f may be employed in performing a FCAW welding operation or process WP. System 200 includes a power source 202, a wire feeder 210 and a welding torch 220 coupled to wire feeder 210 by a torch cable 222. Power source 202 converts input power to create welding current and voltage waveforms (e.g., a welding signal) at an electrical output 204 thereof for selective application of the welding signal to welding process WP through an electrical circuit formed by a power source cable 206, a wire feeder input 212 and a switch 216 in wire feeder 210, as well as an output cable 218 providing connection from switch 216 to torch cable 222. An operator (not shown) engages or actuates a torch trigger 224 that signals a wire feeder controller 214 to close switch 216 to thereby provide welding current to a contact inside a torch nozzle 226. This causes creation of a welding arc (not shown) between the end of electrode 10f and a workpiece W that is grounded to a ground terminal of power source 202. Wire feeder 210 also operates according to the torch trigger signal to selectively feed cored welding electrode 10f to torch cable 222 from supply reel 90, where reel 90 may be internal to or outside of the enclosure of wire feeder 210. Cored electrode wire 10f is drawn or paid out from supply reel 90 via a motorized wire feeding system including a motor 223 driving one or more feed rolls 225 so as to direct electrode 10f from reel 90 to welding process WP through torch cable 222, wherein motor 223 may be separately supplied or may be powered by power from power source cable 206. Wire feeder 210 may optionally include apparatus (not shown) for directing shielding gas to welding process WP through torch cable 222, wherein the trigger actuation also controls operation of the motorized feeding system and the optional provision of external process shielding gas.

The invention has been illustrated and described with respect to one or more exemplary implementations or embodiments. However, equivalent alterations and modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary implementations of the invention. In addition, although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising.".

Having thus described the invention, the following is claimed:

1. A method of manufacturing cored welding electrode, said method comprising:
   providing a strip of sheath material having laterally opposite outer edges;
   forming said strip into a U or V shape to provide a channel between said outer edges;
   adding core fill material into said channel; joining said outer edges to provide a cored electrode structure with said fill material substantially enclosed within said sheath material;
   applying a calcium hydroxide based drawing lubricant to an outer surface of said cored electrode structure to provide a coated cored electrode with a calcium based lubricant coating, said lubricant comprising at least about 15 weight percent calcium hydroxide by weight and less than about 40 weight percent calcium hydroxide by weight; and
   performing a drawing process on said coated cored electrode after applying said calcium hydroxide based drawing lubricant.

2. A method as defined in claim 1, wherein said calcium hydroxide based drawing lubricant comprises
   about 5 to 10 percent graphite by weight and
   about 30 percent or more nontoxic metal by weight.

3. A method as defined in claim 1, wherein applying said calcium based drawing lubricant to said outer surface of said cored electrode structure comprises:
   providing said calcium based drawing lubricant in the form of granules or powder in a container, and
   passing said cored electrode structure through said calcium based drawing lubricant in said container over a predetermined linear distance.

4. A method as defined in claim 3, further comprising
   controlling an amount of said calcium based drawing lubricant applied to said outer surface.

5. A method as defined in claim 1, further comprising
   controlling an amount of said calcium based drawing lubricant applied to said outer surface.

6. A method as defined in claim 4, wherein controlling the amount of said calcium based drawing lubricant applied to said outer surface comprises
   controlling at least one of a speed at which said cored electrode structure is passed through said calcium based drawing lubricant and said predetermined linear distance.

7. A method as defined in claim 1, wherein performing said drawing process comprises
   compacting said cored electrode structure.

8. A method as defined in claim 1, wherein
   performing said drawing process sets a final outer diameter for said cored welding electrode.

9. A method as defined in claim 5, wherein
   said core fill material is a granular or powder fill material including flux materials.

10. A method as defined in claim 1, wherein
    said core fill material is a granular or powder fill material including flux materials.

11. A method as defined in claim 1, further comprising
    applying a calcium hydroxide based drawing lubricant to said cored electrode after performing said drawing process.

* * * * *